US009697278B2

United States Patent
Morris et al.

(10) Patent No.: US 9,697,278 B2
(45) Date of Patent: Jul. 4, 2017

(54) QUERY GENERATION USING TEXT AND AUDIO

(75) Inventors: Robert W. Morris, Atlanta, GA (US); Neeraj Singh Verma, Lawrenceville, GA (US); John Willcutts, Marietta, GA (US); Marsal Gavalda, Sandy Springs, GA (US)

(73) Assignee: NEXIDIA INC. GA (US)

( * ) Notice: Subject to any disclaimer, the term of this patent is extended or adjusted under 35 U.S.C. 154(b) by 0 days.

(21) Appl. No.: 13/286,719

(22) Filed: Nov. 1, 2011

(65) Prior Publication Data

US 2013/0110849 A1    May 2, 2013

(51) Int. Cl.
*G06F 17/30* (2006.01)
(52) U.S. Cl.
CPC .. *G06F 17/30663* (2013.01); *G06F 17/30637* (2013.01); *G06F 17/30648* (2013.01)
(58) Field of Classification Search
None
See application file for complete search history.

(56) References Cited

U.S. PATENT DOCUMENTS

| 8,515,972 B1* | 8/2013 | Srikrishna | G06F 17/30864 707/750 |
| 2008/0040325 A1* | 2/2008 | Sachs et al. | 707/3 |
| 2008/0140644 A1* | 6/2008 | Franks et al. | 707/5 |
| 2008/0316888 A1* | 12/2008 | Reifman | H04M 1/575 369/69 |
| 2012/0084312 A1* | 4/2012 | Jenson | G06F 17/3097 707/767 |

OTHER PUBLICATIONS

User's Manual for the Examienrs Automated Search Tool (EAST) 2.0 Nov. 3, 2003, Computer Sciences Corporation, 253 pages.*
Search | define search at dictionary.com [captured Oct. 9, 2014], dictionary.com, http://dictionary.reference.com/browse/search?s=t.*
Microsoft Help Files: Hear text read aloud with Narrator [captured Oct. 9, 2014], Microsoft, 2 pages.*
Pash, Windows 7 Release Date Jun. 2, 2009 [captured Oct. 9, 2014], lifehacker.com, http://lifehacker.com/tag/windows-7-release-date.*

\* cited by examiner

*Primary Examiner* — Jason Liao
(74) *Attorney, Agent, or Firm* — Pearl Cohen Zedek Latzer Baratz LLP

(57) ABSTRACT

In a general aspect, an approach to query specification includes processing a query by identifying one or more terms and validating the terms using a first corpus of media elements. The result of the validation is used to form a modified query. In some examples, identifying the one or more terms is based on a second corpus of media elements, which may include a different type of media than the first corpus. In some examples, the validating of the terms includes accepting input from a user according to parts of the elements of the first corpus presented to the user.

19 Claims, 2 Drawing Sheets

QUERY GENERATION USING TEXT AND AUDIO

CROSS-REFERENCE TO RELATED APPLICATIONS

This application is related to U.S. Provisional Application Ser. No. 61/554,168, titled "Query Generation," filed Nov. 1, 2011, which is incorporated herein by reference.

BACKGROUND

This invention relates to query generation, and more particularly to query generation for retrieval of relevant content from multiple media sets of different types.

Content based searching of media, such as text based or audio based media, can use linguistically-based queries. For example, keyword based queries have been used for text search as well as for audio search using keyword spotting techniques. Queries can involve logical AND or OR combinations requiring all or any, respectively, of a set of specified keywords to be found. More complex queries may form Boolean expressions, for example, using nested logical operators, and can use proximity based connectors.

Specification of a query that provides high performance, for example, measured according to a relationship of a detection (recall) rate of relevant media elements compared to a rejection rate or false alarm rate of irrelevant media elements, can require manual specification of the terms and Boolean combination that define the query. However, such manual specification is difficult, for instance, requiring intensive expert knowledge of the query language. In some systems, the query can include quantitative factors, for instance that weight various components of a query, and optimizing such factors can be time consuming if performed manually.

SUMMARY

In a general aspect, an approach to query specification includes processing a query by identifying one or more related terms and validating or evaluating the terms using a first corpus of media elements. The result of the validation is used to form a modified query. In some examples, identifying the one or more terms is based on a second corpus of media elements, which may include a different type of media than the first corpus. In some examples, the validating of the terms includes accepting input from a user according to parts of the elements of the first corpus presented to the user.

In some examples, the first corpus comprises audio recordings and the second corpus comprises text.

In another aspect, in general, a method for determining a media search query includes accepting a first query specification and a specification of a first media set. The first query specification is used to identify related terms using a second media set. The identified related terms are then evaluated using the first media set. User input characterizing the evaluation of the identified related terms is accepted, and a second query is specification is formed based on the identified related terms and the accepted user input.

Aspects can include one or more of the following features.

The steps are iterated one or more times to form at least a third query specification.

The first media set comprises an audio media set and the second media set comprises a text media set.

The text media set comprises a text database, for instance, an Internet accessible database (e.g., Wikipedia).

The first media set and the second media set comprise different media types of customer interactions. For instance, the search query for accessing customer interaction records in a customer interaction center (e.g., "call center").

Using the first query specification to identify related terms includes accepting one or more user indications characterizing relevance of the related terms.

Evaluating the identified terms using the first media set includes applying a spotting technique that includes at least one of detection and scoring of instances of the related terms in the first media set.

Evaluating the identified related terms includes forming a user presentation of instances of the related terms in the first media set.

Accepting user input characterizing the evaluation of the identified related terms includes accepting at least one of an indication of relevance of the instance and an indication related to the correspondence of the related term and the instance in the first media set.

Forming a second query specification based on the identified related terms and the accepted user input comprises forming a structure of the second query that is different from a structure of the first query Forming a second query specification based on the identified related terms and the accepted user input comprises determining numerical parameters (e.g., optimization parameters) associated with terms in the second query.

A third media set different than the first media set and the second media set according to the second query specific.

In another aspect, in general, a computer implemented system for forming search queries comprises a user interface, an interface for accessing a first media set, an interface for accessing a second media set, and one or more control modules configured to perform steps of the methods presented above.

In another aspect, in general, software stored on a tangible computer-readable medium comprises instructions for causing a data processing system to perform steps of the methods presented above.

In another aspect, in general, a computer-implemented query generation system (Query Builder) implements a procedure including:

1) Initialization
   a. User interaction
     i. User construct Media Set for building query
     ii. User optionally provides list of Relevance Regions in the media
     iii. User provides list of terms or free text
   b. Query Builder
     i. Convert free text into terms
     ii. Evaluate all terms and put terms that meet a threshold into the Discovered Terms set.
2) Iteration (Repeat until convergence on Metric or user interruption)
   a. Query Builder presents user with putative Results
     i. User marks whether putative hit is true match
     ii. User marks whether media segment is relevant
   b. Query Builder processes Dispositioned Results
     i. Optimize existing Query Structure
     ii. Create new set of putative Results
   c. Query Builder updates the Discovered Terms
     i. Collect related phrases and carrier phrases based on Active Phrases
     ii. Run searches using these phrases iii. Add terms to Discovered Terms based on score that is a function of number of results and relevant results
d. Query Builder presents user with Discovered Terms
   i. User can select any phrase to add to Active Terms
   ii. User can perform Forensic Search of any term and decide whether to add it to the Active Terms where in at least some embodiments, the terms above can correspond to the following:

Query Builder—Name of the described system
Media Document—Single media file (can be any type of media including audio and text)
Media Set—Collection of media documents
Result—A location in a media document defined by a start and end offset.
Dispositioned Result—A result where the contents of the media has been compared against the query text
Structured Query—Defined by a collection of terms and logic used to combine them (e.g. OR, AND, ANDNOT)
Relevance Region—Defined by a start and end time offset in a media document to denote a region of the media that matches the user's intent for the structured query.
Metric—A function of the media set, structured query, dispositioned results, and relevance regions that describes the quality of the query.
Discovered Terms—A set of terms that have been automatically discovered by Query Builder
Active Terms—A set of terms that consists of user validated terms that are actively used by Query Builder to construct the Structured Query
Forensic Search—A simple search run on the current media set.

One or more aspects address the technical problem of specifying a query with precise structure and/or numerical parameters that is suitable for accessing a media set and retrieving relevant portions. Manual specification of such a query is very difficult to perform manually, and these aspects make such specification feasible, even in situations in which a user has no special knowledge or training in the art of query specification.

Other features and advantages of the invention are apparent from the following description, and from the claims.

DESCRIPTION

Figure 1:
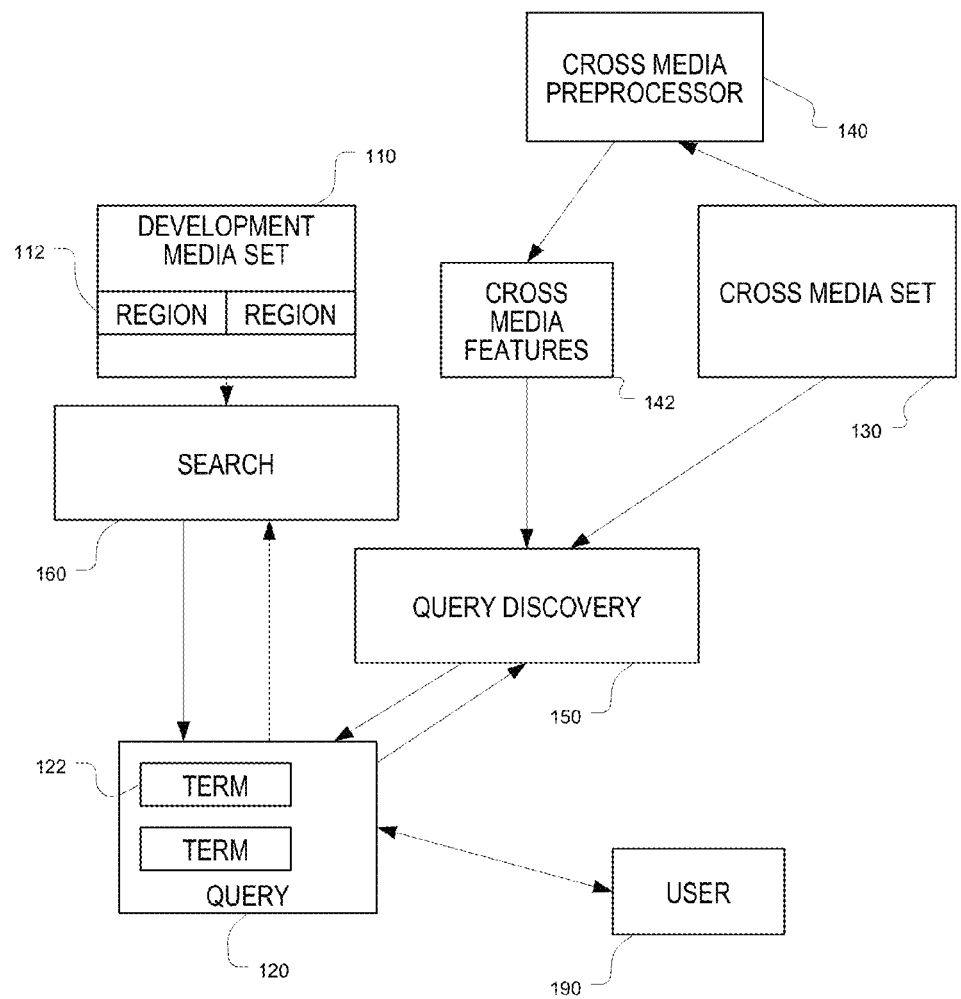
FIG. 1 is a block diagram of a query building system.

Referring to FIG. 1, an example of a system is shown that provides automated and/or semi-automated support for specification of a query for searching for relevant media elements. One type of support is for specification of a query for searching for relevant audio media elements.

A function of the system can be illustrated by way of an example in which a user seeks to find audio media elements related to "school." As a first query, the user specifies the query having a single term "school."

To support the specification of a refined query, the user specifies (or the system otherwise provides) a media set 110, which is referred to below as a development media set. In this example in which an audio query is being addressed, the development media set is an audio media set. This media set is used to evaluate queries 120 and/or components (e.g., terms) of queries 122. In some examples, the user's specification of the development media set may be in the form of a specification of a set of relevance regions 112 (or other portions) of the media set. As an example, if the development media set is a corpus of recorded telephone calls between customers and call center agents, the user may specify a set of such calls as the development media set, for instance based on metadata associated with the calls.

To further support the specification of the refined query, the user specifies (or the system otherwise provides) a second media set 130, which is referred to below as a cross-media development set. In this example in which the development media set is audio, the cross-media development set may be a text media set. Examples of such a cross-media set can include text communication between customers and agents, for example, email or chat communication. Other examples include text corpora, which may be related to the development media set by topic or other common characteristic. An example of such a text corpus is an encyclopedia, for instance the online Wikipedia. In some examples, the cross-media development set is pre-processed 140 to determine characterizing features 142, such as vocabulary, statistical synonyms, named entities, repeated phrases, phrase structured or statistical language models etc.

In this example in which the user 190 provides the initial query with a single term "school", the system accesses the cross-media development set 130 (and/or its characterizing features 142) to a query automation function 150 to identify potential terms, which are referred to below as discovered terms. For instance, the system identifies "the school", "high school", "private school", "school system", and "public school system", as common phrases represented in the cross-media set that contain the word "school." One way such an identification step may be performed is by exhaustive searching of the cross-media set and accumulating the common contexts. Another way is to use a statistical N-gram language model and determine statistically likely contexts form the model. As another type of discovered term, the system may identify terms that appear to co-occur in the cross-media set. An example of such a term is "education."

Figure 2:
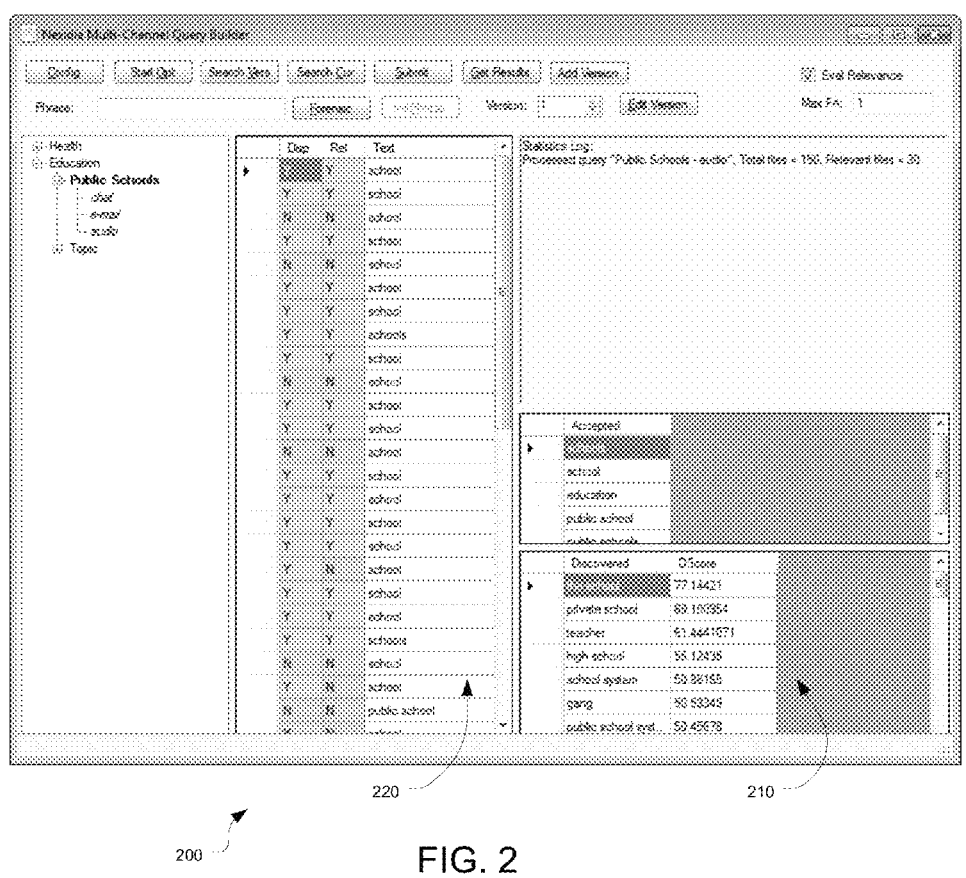
FIG. 2 is a graphical user interface

Referring to FIG. 2, in some version of the system, the user is provided with a graphical user interface 200, which includes a presentation 210 of the discovered terms, and the user is permitted to exclude some of the discovered terms from further consideration to form an active term set, for instance, because the user recognizes that the discovered term is not relevant to the desired results of the query. For instance, if the word "gang" tends to co-occur with the word "school", and the user is not seeking results related to gangs, the user would exclude the "gang" term from further consideration. Similarly the user may be permitted to augment the active terms, for example, based on the user's domain knowledge and implicit suggestion from the system-discovered terms.

The term of the original query, "school", as well as the discovered terms, are located by a search component 160 (see FIG. 1) in the development media set 110. In this example, the underlying search technology is based on word spotting, and these terms are located and scored in the media set using the word spotter. In other examples, other audio processing technologies may be used, for example, based on full speech-to-text conversion (i.e., automated transcription) or based on other (e.g., statistical) classification, identification, or detection approaches.

The located instances of the terms are presented to the user. In one form of user interface, the instances are provided in a list that the user can navigate. For each instance, the user can listen to the located instance with a selected extent of context. Based on this listening, the user can verify if the system truly identified the term or if there was a false positive (false alarm) for the term. As an example, if the speaker recorded for an instance truly said the word "school", then the disposition of that instance is marked as "true" by the user. On the other hand, is the speaker had said "so cool", the user would mark the disposition of that instance as "false" to indicate that the word spotting system had made an error. The user can also use the context to make an assessment of whether an instance is relevant in that it represents a result that the user would desire to retrieve with his query. As an example, a word "school" may be correctly found in the development media, but be in an irrelevant context. If the user is looking for media related to public school education, then instances discussing "school girl fashion" or a "driving school" may be marked as not relevant by the user.

Based on the user input, the system enters an automated phase in which a refined query is constructed to match the user's input. For example, it would be desirable for the system to avoid the false positives, and to select or rank the development media set to match the user's relevance ratings. The refinement of the query can take a number of forms, generally falling into refinement of the structure of the query and refinement of numerical factors in the query.

As an example of a structural refinement of a query, the system may determine that the phrase "public school" is highly relevant and occurs in a large number of the relevant portions of the development media, as well as the plural variant of the word "school", "schools", as well as the related term "education". Based on this determination, the system constructs a modified query structure, for example (OR (OR "school" "schools") "education" (OR "public school" "public schools")). The nesting or the terms can be based on the nature of the relationship between the terms, and may aid in the setting or numerical factors related to the terms.

Other structural elements may be related to false alarms. For instance, the word sequence "so cool" may be identified by the system as phonetically similar to "school" and likely present at the false alarms and an expression (NOTLIKE "so cool" "school") to indicate instances of "school" that are not like "so cool".

The elements of a query may be weighted, so that presence of elements can receive different weights which are used alone or in combination with scores that represent a degree of certainty that the underlying system located a correct instance of a term. For example, an OR component of a query may have weights (OR 0.78 "school" 0.01 "education" 0.85 "public schools") as a weighted form of a component. These numerical weight factors are optimized to provide the best retrieval of the relevant parts of the development set. In some example, this optimization is based on the ranking capability of the system based on an overall score provided for the derived query, with this ranking capability being representable as a Receiver Operating Characteristic (ROC) of a detector for the relevant portions.

In some examples, the user is provided with the capability to manually refine the query further, for instance, based on the user's domain knowledge.

In some examples, the process is iterative. In the next iteration, rather than using the original query with a single term "school", the first automatically refined query is used in its place. This query is used to identify further discovered terms. Note that the query will in general identify more relevant parts of the cross-media set, and therefore new and potentially more important co-occurring terms may be found by the system. For instance, the term "committee member" may be discovered as co-occurring because of parts of the cross media set that relate to deliberations of a "school committee" with frequent references to statements by a committee member. Similarly, named entities such as "South Central" may be identified because of a concentration of parts of the media related to a particular school. Therefore, it should be evident that the discovery process for terms may yield different and potentially more important new terms at each iteration.

In the discussion above, the focus is on forming a query for audio media using text cross media. In some examples, a single query formed that is suitable for multiple media sources. The query being refined may be applied to text media or a combination of text and audio media, and the user may provide the relevance feedback that is used to refine the query. Aspects of a query that are particular to a media type (e.g., a degree of proximity in time for audio, and in words for text) may be represented generically in the query being constructed and mapped to the media-specific form when it is applied. In some examples, a query for text chat is formed based on a cross-media email set. Such cross media query development can address differences in syntax, spelling, etc. that are present in such disparate text-based media sources.

In some examples of the system, other features are enabled by use of cross-media data. An example is determination of pronunciation of a next text-based term. For example, in the discovery phase, a proper name (e.g., "Nexidia") may be identified. Although an automated pronunciation estimate may be formed based solely on the lexical form of the word, or based on detections of audio instances using that automated pronunciation, use of typical word context may be beneficial. For instance, the text media may include the word "Nexidia" in the phrase "the Nexida system". The system may use this discovered context to locate instances of the entire phrase and from that yield a higher-quality audio-based pronunciation than might be achieved by solely attempting to find instances of the single word.

In some examples, the cross-media set is correlated with the development media set, for example, according to the customer involved in the interaction. The system may leverage such correlation, for example, in the term discovery phase to identify co-occurring terms (e.g., when "high school" is located in a customer's audio, the text term is "South Central" is likely in the customer's text, and therefore is linked to "high school").

Implementations of the approaches described above may make use of a computer system that maintains or provides access to the stored media sets. As indicated above, the media sets may be recordings or other storage of person-to-person interactions that pass over a communication system (e.g., telephone, email). The computer system may include or control a user interface for the user who is refining the query, for example, with a directly coupled screen interface or remotely over a computer network. The resulting query can be stored on a computer readable medium (e.g., a computer disk) and represents functional content that imparts search or retrieval functionality on an automated (e.g., computer implemented) search engine that is used to retrieve content based on the query (i.e., the query functions as instructions that instruct a computerized search engine how to perform a specific search function). Implementations of the approaches described above may include stored computer instructions that cause a computing system to perform the functions described in this document. In some implementations, the functions are implemented in a centralized manner, while in other implementations different components may be independently implemented and used separately. For example, a component used for discovery of related terms to a query may be separately implemented, and may be used as above or for other data analysis tasks.

It is to be understood that the foregoing description is intended to illustrate and not to limit the scope of the invention, which is defined by the scope of the appended claims. Other embodiments are within the scope of the following claims.

What is claimed is:

1. A computer implemented method for determining a media search query comprising:
   accepting a first query specification and a specification of an audio media set;
   using the first query specification to identify related terms in a text media set;
   after identifying the related terms in the text media set, searching an audio of the audio media set according to the identified related terms to identify instances of the identified related terms in the audio of the audio media set;
   after searching the audio of the audio media set, accepting user input characterizing an evaluation of the identified related terms, the evaluation based on the identified instances of the identified related terms in the audio of the audio media set; and
   forming a second query specification based on the identified related terms in the text media set, the identified instances of the identified related terms in the audio of the audio media set, and the accepted user input.

2. The method of claim 1 further comprising iterating the steps of claim 1 one or more times to form at least a third query specification.

3. The method of claim 1 wherein the text media set comprises a text database.

4. The method of claim 1 wherein the audio media set and the text media set comprise different media types of customer interactions.

5. The method of claim 1 wherein using the first query specification to identify the related terms comprises accepting one or more user indications characterizing relevance of the related terms.

6. The method of claim 1 wherein the evaluation of the identified terms comprises applying a spotting technique that includes at least one of detection and scoring of instances of the related terms in the audio of the audio media set.

7. The method of claim 1 wherein the evaluation of the identified related terms comprises forming a user presentation of instances of the related terms in the audio of the audio media set.

8. The method of claim 1 wherein accepting user input characterizing the evaluation of the identified related terms comprises accepting at least one of an indication of relevance of the instance and an indication related to a correspondence of the related term and the instance in the audio media set.

9. The method of claim 8 wherein the indication related to the correspondence of the related term and the instance in the audio media set comprises a confirmation that the instance of the related term identified in the audio media set is a positive identification of the related term.

10. The method of claim 1 wherein forming the second query specification based on the identified related terms in the text media set, the identified instances of the identified related terms in the audio of the audio media set, and the accepted user input comprises at least one of forming a structure of the second query that is different from a structure of the first query and determining numerical parameters associated with terms in the second query.

11. The method of claim 1 further comprising processing a third media set different than the audio media set and the text media set according to the second query specification.

12. The method of claim 1 further comprising processing multiple media types of multiple media sets different than the audio media set and the text media set according to the second query specification.

13. A computer implemented system for forming search queries comprising:
   a user interface;
   an interface configured to access an audio media set;
   an interface configured to access a text media set;
   a processor, and
   software tangibly embodied on a non-transitory computer-readable medium comprising instructions which, when executed, configure the processor to:
   accept a first query specification and a specification of the audio media set via the user interface,
   use the first query specification to identify related terms in the text media set via the interface configured to access the text media set,
   search an audio of the audio media set according to the identified related terms to identify instances of the identified related terms in the audio of the audio media set after identifying the related terms in the text media set,
   accept via the user interface user input characterizing an evaluation of the identified related terms, the evaluation based on the identified instances of the identified related terms in the audio of the audio media set after searching the audio of the audio media set, and
   form a second query specification based on the identified related terms in the text media set, the identified instances of the identified related terms in the audio of the audio media set, and the accepted user input.

14. Software tangibly embodied on a non-transitory computer-readable medium comprising instructions which, when executed, cause a data processing system to perform functions comprising:
   accepting a first query specification and a specification of an audio media set;
   using the first query specification to identify related terms in a text media set;
   after identifying the related terms in the text media set, searching an audio of the audio media set according to the identified related terms to identify instances of the identified related terms in the audio of the audio media set;
   after searching the audio of the audio media set, accepting user input characterizing an evaluation of the identified related terms, the evaluation based on the identified instances of the identified related terms in the audio of the audio media set; and
   forming a second query specification based on the identified related terms in the text media set, the identified instances of the identified related terms in the audio of the audio media set, and the accepted user input.

15. The method of claim 1 wherein the evaluation is based on a presentation of the instances of the identified related terms in the audio media set to a user.

16. The method of claim 15 wherein the presentation of the instances of the identified related terms in the audio media set to the user comprises an audible presentation of the identified related terms to the user.

17. The method of claim 1 wherein forming the second query specification based on the identified related terms in the text media set, the identified instances of the identified related terms in the audio of the audio media set, and the accepted user input comprises identifying false alarm terms based on the accepted user input and using the identified false alarm terms in the formation of the second query specification.

18. The method of claim 1 wherein the text media set is related to the audio content of the audio media set.

19. The method of claim 1 wherein the text media set and the audio of the audio media set share a common characteristic, wherein the common characteristic includes a topic.

* * * * *